United States Patent [19]

Fine et al.

[11] 4,173,002

[45] Oct. 30, 1979

[54] METHOD OF LASING WITH 7-HYDROXY-COUMARIN-8-METHYLENEIMINOBISACETIC ACID AND METAL COMPLEXES THEREOF

[75] Inventors: Dwight A. Fine; Aaron N. Fletcher, both of Ridgecrest, Calif.

[73] Assignee: The United States of America as represented by the Secretary of the Navy, Washington, D.C.

[21] Appl. No.: 888,122

[22] Filed: Mar. 20, 1978

[51] Int. Cl.$^2$ .................................................. H01S 3/20
[52] U.S. Cl. ........................... 331/94.5 L; 252/301.17
[58] Field of Search .............. 331/94.5 L; 252/301.17, 252/301.18; 260/343.44

[56] References Cited

U.S. PATENT DOCUMENTS 4,051,062 9/1977 Hammond et al. .............. 331/94.5 L

OTHER PUBLICATIONS

Ishibashi et al., Chemistry Letters, pp. 1315-1316 (1974, Chemical Society of Japan).
O'Leary, Optics Communications, vol. 14, No. 4, Aug. 1975, pp. 392-394.
Salam Khan et al., Anal. Chim. Acta, vol. 49, pp. 255-260 (1970).
Schaefer, Ed., Dye Lasers, (Springer-Verlag, N.Y., 1973), pp. 147-149, 161-167, 184-185.

*Primary Examiner*—William D. Larkins
*Attorney, Agent, or Firm*—R. S. Sciascia; W. Thom Skeer; L. E. K. Pohl

[57] ABSTRACT

A method for lasing comprising preparing an aqueous solution of a member selected from the group consisting of 7-hydroxy-coumarin-8-methyleneiminobisacetic acid and the $Ca^{++}$, $Sr^{++}$, $Ba^{++}$ and $Al^{+++}$ complexes thereof and subjecting the solution to the energy provided by a laser.

9 Claims, No Drawings

METHOD OF LASING WITH 7-HYDROXY-COUMARIN-8-METHYLENEIMINOBISACETIC ACID AND METAL COMPLEXES THEREOF

BACKGROUND OF THE INVENTION

1. Field of the Invention

This invention relates to a method for lasing.

2. Description of the Prior Art

The advantages of dye lasers and the fact that many fluorescent organic dyes will give laser emissions are well known. However, all fluorescent organic dyes will not lase. In fact, it is sometimes the case that one of a pair of very similar dyes will lase while the other will not.

It is known that some metallic complexes of fluorescent organic dyes will lase. However, very little laser experimentation has been carried out with such complexes.

The art most pertinent to this invention was disclosed by Ishibashi et al. in *Chemistry Letters*, 1974, pp. 1315–1316 which reports that calcein blue and the $Ba^{++}$, $Sr^{++}$, $Ca^{++}$ $Al^{+++}$ complexes thereof will lase when pumped with a 700 kW nitrogen laser.

SUMMARY OF THE INVENTION

It has now been unexpectedly found that aqueous solutions of 7-hydroxy-coumarin-8-methyleneiminobisacetic acid, which differs from calcein blue in that it contains no 4-methyl group, and the $Ba^{++}$, $Sr^{++}$, $Ca^{++}$ and $Al^{+++}$ complexes thereof will lase in a 25 kW nitrogen laser which is much less powerful than the laser used by Ishibashi et al.

DESCRIPTION OF THE PREFERRED EMBODIMENTS

7-Hydroxy-coumarin-8-methyleneiminobisacetic acid may be prepared using methods set fourth by Salam Khan and Stephen in *Anal. Chim. Acta*, 49 (1970) 255–260. Addition of certain metal ions such as $Ca^{++}$, $Sr^{++}$, $Ba^{++}$ and $Al^{+++}$ to aqueous solutions of 7-hydroxy-coumarin-8-methyleneiminobisacetic acid produces complexes.

The dye has the same structure as calcein blue except for the absense of a methyl group in the 4-position. Aqueous solutions of the dye show the usual UV absorption band of coumarins; $\lambda_{max}$ is strongly dependent on pH, ranging from 322 nm at pH $\leq 6$ to 363 nm at pH 12, with $\epsilon_{max}$ about $9 \times 10^3$. All solutions show a bluish fluorescence which is strongest at pH 5–11. The emission spectrum shows a maximum at 460 nm ($\lambda_{EX} = 360$ nm).

In tests in which a 25 kW AVCO Dial-a-Line pulsed nitrogen laser was used, solutions which were $\geq 5 \times 10^{-3}$ M in 7-hydroxy-coumarin-8-methyleneiminobisacetic acid and ranged from pH 7 to pH 10 lased strongly at about 467 nm. A solution which was $5 \times 16^{-3}$ M but with pH 3 lased at about 459 nm.

The addition of metal ions to basic solutions of the dye to form complexes produces alterations in the UV absorption spectrum. At pH 7–10, the absorption maximum shifts to 363 nm and $\epsilon_{max}$ increases to about $1.4 \times 10^4$. At pH $> 10$, no shift in maximum occurs but the intensity of the band increases by 10 to 20%.

Solutions equimolar in dye (concentration $\geq 5 \times 10^{-3}$ M) and metal ion as well as solutions containing a five-fold excess of metal ion were tested in the 25 kW AVCO laser. The sources of the metal ions were the metal chlorides. However, other sources could have been used. Solutions at pH 7–11 were tested. All showed strong lasing in the blue region.

Aluminum ion was added to a solution $5 \times 10^{-3}$ M in dye and having a pH of 3. The complex showed strong lasing at about 445 nm.

In preparing the solutions described above, sodium hydroxide was used to provide basisity and hydrochloric acid was used to provide acidity. Again, as in the case when the metal chlorides were used as the source of the metal ions, other materials could have been used to provide basisity or acidity.

Solutions having concentrations up to about $1 \times 10^{-2}$ were tested. However, it should be apparent that solutions having concentrations greater than $1 \times 10^{-2}$ will lase. Also, solutions having concentrations lower than $5 \times 10^{-3}$ would probably lase with a light source of stronger output.

What is claimed is:

1. A method for lasing comprising the steps of:
   preparing a solution of a member selected from the group consisting of 7-hydroxy-coumarin-8-methyleneiminobisacetic acid and the $Ca^{++}$ $Sr^{++}$, $Ba^{++}$ and $Al^{+++}$ complexes of 7-hydroxy-coumarin-8-methyleneiminobisacetic acid; and
   subjecting said solution to energy provided by a laser whereby said member is caused to lase.

2. A method according to claim 1 wherein said laser is a 25 kW nitrogen laser.

3. A method according to claim 2 wherein said solution is a solution of 7-hydroxy-coumarin-8-methyleneiminobisacetic acid having a molarity of $\geq 5 \times 10^{-3}$.

4. A method according to claim 2 wherein said solution is a solution of a member selected from the group consisting of the $Ca^{++}$, $Sr^{++}$, $Ba^{++}$ and $Al^{+++}$ complexes of 7-hydroxy-courmarin-8-methyleneiminobisacetic acid and is prepared by forming a solution of 7-hydroxy-coumarin-8-methyleneiminobiacetic acid having a molarity of $\geq 5 \times 10^{-3}$ and adding an equimolar to five-fold excess of complexing metal ion.

5. A method according to claim 3 wherein said solution has a pH in the range of from 7 to 10.

6. A method according to claim 3 wherein said solution has a pH of 3.

7. A method according to claim 4 wherein said solution has a pH in the range of from 7 to 10.

8. A method according to claim 4 wherein said solution has a pH of $\geq 10$.

9. A method according to claim 4 wherein the complexing ion is $Al^{+++}$ and the solution has a pH of 3.